United States Patent [19]
Lemery

[11] 3,745,870
[45] July 17, 1973

[54] SAW CHAIN

[76] Inventor: Douglas J. Lemery, 3215 Ripon Road, Victoria, British Columbia, Canada

[22] Filed: July 26, 1971

[21] Appl. No.: 166,033

[52] U.S. Cl. .............................................. 83/833
[51] Int. Cl. ........................................ B27b 33/14
[58] Field of Search .................. 143/135 R, 135 G, 143/141, 133 R; 83/831–834

[56] References Cited
UNITED STATES PATENTS
3,346,025  10/1967  Anderson et al. ............ 143/135 R
2,762,227  9/1956   Tweedie ........................ 143/135 R FOREIGN PATENTS OR APPLICATIONS
152,505    11/1955  Sweden ......................... 143/135 R

*Primary Examiner*—Donald R. Schran
*Attorney*—Richard W. Seed et al.

[57] ABSTRACT

A cutter tooth for a saw chain having a reappearing sequence of pivotally connected center and side links wherein the cutter tooth is made up of two separate and flexible center mounted cutter tooth elements which extend laterally and upwardly from the center line of the chain to form the cutter tooth. The cutter tooth elements are made of flexible steel and are of proper thickness to allow the cutter elements to flex outwardly under cutting loads to obtain a kerf which is slightly wider than the mechanical width of the cutter elements when not under load. The two piece cutter tooth has its own depth gauge integral therewith for positive control. A pair of novel L-shaped raker teeth is used in combination with the two piece cutter. Each raker tooth is flat in a transverse direction, has a reverse angle on its leading edge as compared to conventional rakers. The raker teeth are oppositely directed and so constructed as to remove chips across the complete width of the kerf to clear the way for succeeding depth gauge elements. Each raker tooth also has its own integral depth gauge.

17 Claims, 5 Drawing Figures

PATENTED JUL 17 1973 3,745,870
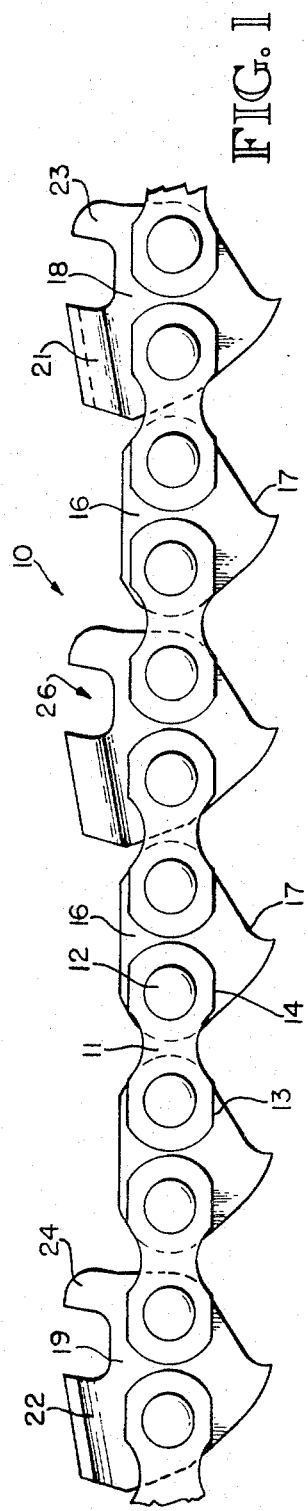
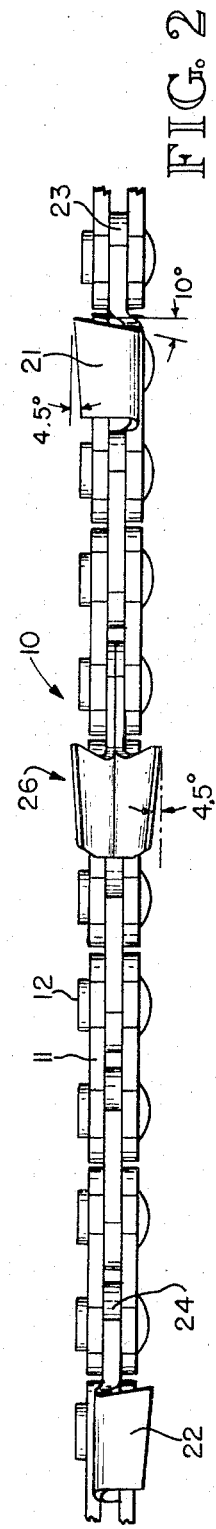
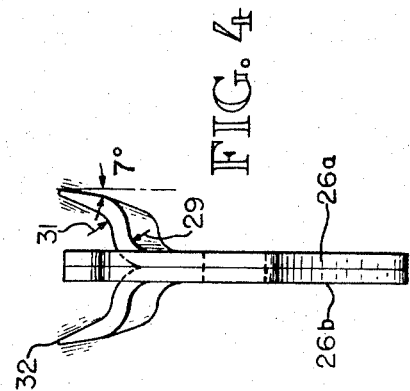
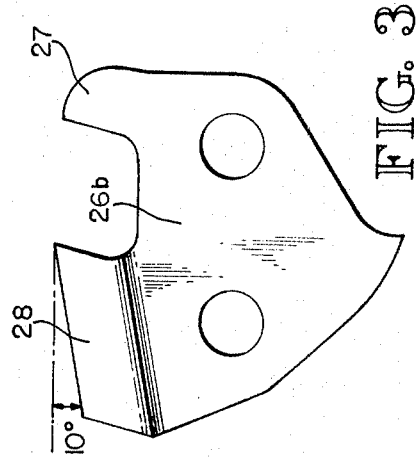
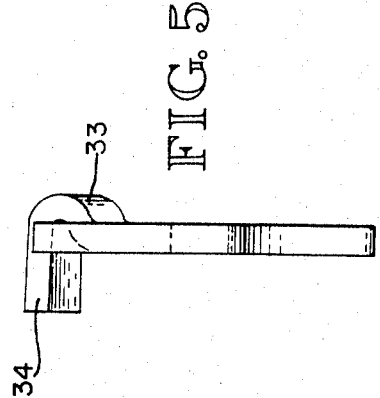
INVENTOR.
DOUGLAS J. LEMERY
BY Seal, Berry, Dwery & Cross
ATTORNEYS

SAW CHAIN

BACKGROUND OF THE INVENTION

This invention relates to saw chains for use on portable or stationary chainsaws and more particularly to a new and improved saw chain construction including novel cutter and raker tooth structures. The cutter tooth construction of the present invention provides a bifurcated or U-tooth cutter link with an integral depth gauge wherein the cutter elements are capable of lateral flexing under cutting loads. The novel raker tooth provides for more complete chip and fiber removal as a result of its novel cooperation with the cutter tooth.

Although many configurations of cutter tooth and raker tooth combinations have been used in the prior art and in particular U or V-shaped bifurcated and center-mounted cutter teeth, the problems of binding, overheating and excessive power requirements have not been solved. These factors result in very slow cutting and hence the bifurcated center-mounted cutter tooth has not been competitive compared to conventional designs. In addition, the problems encountered in manufacturing the conventional U or V tooth render the cost prohibitive and the reliability of the tooth poor. For instance, as many as 17 forming steps including three annealings may be necessary in its formation. Because the metal must be split and upset, close tolerances cannot be held eg. width, thickness of the tooth sides, etc., and the resulting tooth breaks or bends very easily, even under normal running conditions, because of the manner in which it must be formed. Another drawback which adds to the expense of such teeth is the sophisticated equipment needed for its manufacture, including expensive short life dies. The present invention seeks to eliminate these problems by providing a bifurcated cutter tooth which can be easily formed and is inexpensive to manufacture in quantity. Only conventional and inexpensive dies are necessary for its formation and tolerances may be closely held. Since the metal need only be bent with reasonable radii and the metal remains flexible, breakage is held to an absolute minimum. The cutter elements are permitted to flex laterally in both directions under cutting loads and hence the initial shock of any binding action will be relieved by inward flexing of the elements. The ability of the cutter elements making up the cutter tooth to deflect laterally outwardly under cutting loads, such that the distance between the cutter elements is actually increased beyond the mechanical width of the tooth, provides a more free-running and non-binding saw chain which consequently runs cooler and requires less power.

The primary object of the present invention is therefore to provide a bifurcated cutter tooth construction and a cutter, raker and depth gauge sequence which results in far superior performance of the chain in terms of eliminating binding, overheating, excessive power requirements, provision for better chip removal and speed of cutting.

Another and more specific object of the present invention is to provide a bifurcated center-mounted cutter tooth construction wherein the cutter elements making up the tooth are of the proper thickness and configuration so as to be flexible, allowing the cutter elements to flex laterally in both directions to increase the width of the kerf and avoid shock loading during operation.

BRIEF DESCRIPTION OF THE DRAWING

FIG. 1 is a side elevational view of a section of saw chain embodying the invention;

FIG. 2 is a top plan view thereof;

FIG. 3 is an elevational view of a single cutter tooth;

FIG. 4 is a front elevational view of the bifurcated cutter tooth illustrating the flexibility of the cutter elements; and FIG. 5 is a front elevational view of the raker tooth.

DESCRIPTION OF THE PREFERRED EMBODIMENTS

Referring in detail to the drawings, FIGS. 1 and 2 illustrate a sequence of links designated in its entirety by the numeral 10 and it will be understood that such sequence is repeated in the same order and arrangement throughout the length of the chain. The particular chain described by way of example in the present specification will be understood to be a ⅜ inch pitch chain with all sizes and dimensions referred to being related thereto. The sequence includes side links, spacer drive links and drive links which mount the cutter teeth and raker teeth along with their depth gauges integral therewith. The side links 11 along with the rivets 12 serve to join the center links in end-to-end pivotal relationship in a well-known manner with the bottom surfaces 13 and 14 of the side links providing a surface for supporting the chain on the rails of a saw bar, not shown. The side links 11 are merely positioned on opposite sides of the chain and are identical and interchangeable.

The center links of the chain are of three different forms, spacer links, raker links and cutter links. The links 16 are identical and constitute the spacer links which include sprocket engaging portions 17 which engage and are trained about the drive sprocket of the engine or power unit (not shown) for driving the chain. The configuration of the spacer links are of a design well known to those skilled in the art. The configuration of the root portions of all of the center links may be identical and of a standard configuration which needs no further explanation.

The novel cutter link of the present invention is indicated at 26 and comprises two pieces 26a and 26b which are in effect mirror images of one another. Each piece 26a and 26b is formed with a sprocket engaging root portion substantially identical to the sprocket engaging portions of the other center links previously described. When the chain is assembled as illustrated in FIG. 1, the two halves are held together and will be approximately equal the thickness of the remaining center links. It would of course be possible to permanently join the link pieces or use an integral structure so long as flexibility of the two halves is maintained. Each of the cutter link pieces has integrally formed thereon a depth gauge portion 27 and a side cutter element 28. The side cutter elements extend laterally from the central body portion of the link halves and have an approximate 0.05 inch radius at 29 and at 31 with the upper tips of the wing portion or cutter element being disposed at an approximate 7° angle with the vertical. The cutting edges 32 are flat and may be in the order of 0.015 to 0.020 of an inch in width. As seen most clearly in FIG. 3, a longitudinal rake angle of approximately 10° is given to the cutter elements 28 with this angle being variable as desired. The depth gauge portion 27 will, of course, be slightly less in height than the forward cutting faces of the members 28. It is recommended that this difference be maintained in the order of 0.035 inches. When not under cutting load, the distance between the outside edges of the wing portion should be in the neighborhood of 0.315 to 0.320 inches. The leading or cutting faces of the elements 28 may be either straight or curved to allow for easy filing in the field.

As previously mentioned, each half of the cutter tooth is fabricated from a relatively thin piece of sheet metal which will be in the neighborhood of 0.029 inches thick or approximately one half drive link thickness. The steel used to fabricate the tooth half must be flexible such that the lateral wings or cutter elements 28 are free to flex independently when placed under cutting loads. Because of the side rake or taper of approximately 4-½° the tendency will be for the wings to flex outwardly causing the scores or kerfs cut by the cutter elements to be spaced further apart than the mechanical width of the tooth. This increase in width will be in the neighborhood of 0.012 inches with a range of 0.006 to 0.012 inches. In practice, 10–45 steel, as well as regular steel, has been used and it is contemplated that regular chain saw steel would be suitable and perhaps improved if alloyed with nickel to provide elasticity.

The center links 18 and 19 include integral L-shaped raker elements 21 and 22 respectively as well as depth gauge elements 23 and 24, also integral with the links. The depth gauge elements 23 and 24 are, of course, spaced at a predetermined distance ahead of the raker teeth and function to remove the material between the scores made by the cutter elements 28. It will also be noted, referring to FIG. 2, that the raker teeth 21 and 22 extend laterally in opposite directions from the center line of the chain with each raker element being approximately 0.020 inches inside the width of the U-cutter tooth. The top surface of the raker elements 21 and 22 may be formed with a slight longitudinal rake angle of 4.5° as illustrated in FIG. 2 in the same manner as the cutter element. This angle may, of course, be modified without departing from the spirit of the invention. It will also be noted that the top surface is downwardly inclined toward the trailing end of the link with the angle of inclination being approximately 10° as in the case of the cutter tooth which also may be varied depending upon the type of wood, the speed of the chain and other varyable factors. The height of the depth gauge elements 23 and 24 may be determined so as to give the desired cutting characteristics, but preferably should be 0.035 inches below the cutter tooth or the same height as the cutter tooth. In this connection the height of the raker should preferably be from 0.010 to 0.015 inches below rhe cutter tooth.

As may be seen most clearly in FIG. 5, the raker tooth rises vertically out of the center line of the chain and then is directed laterally to one side or the other with a radius 33 between the vertical and lateral portion. This formation results in an L-shaped cross-section with the top surface of the raker being flat, i.e. having no transverse angle. The reason for the flat top surface is to avoid cutting across fibers which have been already severed by the U-tooth cutters. As previsously mentioned, each raker tooth has its own depth integral gauge in order to prevent what is known as "wild cutting" which results from separating the raker and its depth gauge. With the integral depth gauge, absolute control of the depth of cut of the raker is obtained even when boring since the depth of cut remains constant, the chain runs smoother and is hence easier to handle so that the user does not have to "fight" the cahin even under the most adverse conditions. In this connection, it will be noted that the radius of the L-shaped raker tooth goes beyond the center line of the chain which has the result of insuring that the following depth gauges will ride on a constant and flat surface on the bottom of the kerf being cut. This also tends to produce a smooth cutting action.

As seen in FIG. 5, the outboard edges of the raker teeth are not coined but retain their full thickness as illustrated at 34. The purpose of this formation of the raker tooth is to sever any remaining fiber hairs which may remain from the scoring done by the cutter elements. This insures a full width kerf and prevents binding and clogging.

Because of the flat top surface of the raker element, it is satisfactory to file the leading edge of the raker element straight across, as is conventional, without causing a pile-up or clogging of chips as the chain moves. It is preferable, however, to file the leading edges of the raker elements in a direction reverse from that of conventional raker elements such as shown in FIG. 2. The top surface of the raker tooth will thus have a rake angle which is inclined away from the direction of movement of the chain and which is defined for the purpose of this specification as a positive rake angle. This angle is preferably in the neighborhood of from 10° to 20°. This formation gives the raker tooth the tendency to lead into the cut made by the cutter elements thus insuring a complete removal of the chip between the two cuts or scores made by the cutter element. Also, the result of this formation is to insure that all hair-like fibers are severed in order to prevent binding.

From the foregoing it will be apparent that the present invention provides novel, useful and unobvious results in cutter tooth and raker tooth construction as well as link sequence for saw chains of the character under consideration. While the prefered form of the invention has been illustrated and described, it is understood that it is capable of modification and addition without departing from the principle thereof. Accordingly, the invention is not to be limited to the exact form illustrated but only by the literal interpretation of the claims depended hereto.

The embodiments of the invention in which a particular property or privilege is claimed are defined as follows:

1. A saw chain comprising; a plurality of pivotally joined links, said links being assembled in link sequences and each sequence including a plurality of center links pivotally connected by side links, said center links including body portions with sprocket engaging root portions extending therefrom, some of said center links including a raker tooth extending from the body portion in a direction opposite to the root portion, and at least one of said center links including a bifurcated cutter tooth presenting spaced side cutter elements, said cutter tooth extending from the body portion in a direction opposite said root portion, said cutter tooth center link being a composite of two separate mirror image link elements, each of said link elements having its own root portion, body portion and side cutter element, said cutter link elements being made from relatively thin flexible metal so as to allow flexing and deformation under normal cutting loads in the area between the cutter elements and the body portions and being so disposed as to cause flexing laterally outwardly during cutting to increase the distance therebetween beyond the mechanical width of the tooth, and depth guage means associated with said raker and cutter tooth to control the depth of cut thereof.

2. The saw chain according to claim 1 wherein; each sequence includes at least two raker links and a cutter link therebetween, said raker teeth having oppositely directed laterally extending raker elements, the combined width of said raker elements being less than the mechanical width of the cutter tooth.

3. The saw chain according to claim 2 including; at least one spacer center link between each of said raker links and the cutter link.

4. The combination according to claim 3 wherein; said depth guage means comprises; a depth guage element integral with each said links.

5. The combination according to claim 4 wherein the thickness of said cutter link elements is approximately one half the thickness of the remaining center mounted links.

6. The combination according to claim 5 wherein said cutter tooth is U-shaped in cross-section.

7. A saw chain comprising a plurality of pivotally joined links, said links being assembled in link sequences and each sequence including a plurality of center links pivotally connected by side links, said center links including body portions with sprocket engaging root portions extending therefrom, some of said center links including a raker tooth extending from the body portion in a direction opposite to the root portion, and at least one of said center links including a bifurcated cutter tooth presenting spaced mirror image side cutter elements, said cutter tooth extending from the body portion in a direction opposite said root portion, said cutter elements being made from flexible metal so as to allow flexing and deformation under normal cutting loads in the area between the cutter elements and the associated body portion and being so disposed as to cause flexing laterally outwardly during cutting to increase the distance therebetween beyond the mechanical width of the tooth, and depth guage means associated with said raker and cutter tooth to control the depth of cut thereof.

8. The saw chain according to claim 7 wherein, each sequence includes at least two raker links and a cutter link therebetween, said raker teeth having oppositely directed laterally extending raker elements, the combined width of said raker elements being less than the mechanical width of the cutter tooth.

9. The saw chain according to claim 8 wherein; each raker tooth is L-shaped in cross-section having a vertical portion extending in the opposite direction from the associated root portion and a flat top portion extending laterally at right angles to the vertical portion with a radius therebetween, said depth guage means associated with the raker tooth being integral therewith and located on the centerline of the chain, said radius being located on the opposite side of said depth guage from said flat top portion, whereby the flat top portion of the raker will remove a wood chip of at least sufficient width to clear the kerf for succeeding depth guages.

10. The saw chain according to claim 9 wherein the leading edge of said raker tooth has a positive rake angle in the direction of travel of said chain.

11. For use in a saw chain, a center-link-mounted cutter tooth comprising; first and second link elements, said link elements being mirror images of one another and each including a body portion, a sprocket engaging root portion and a cutter element extending laterally outwardly in a direction opposite from said root portion, said link elements being made from relative flexible metal so as to allow flexing and deformation under normal cutting loads in the area between the cutter elements and the body portion, said cutter elements being so disposed as to cause flexing laterally outwardly during cutting to increase the distance therebetween beyond the mechanical width of the tooth.

12. The cutter tooth according to claim 11 including; depth guage elements integral with the body portion of each said link elements spaced ahead of the cutter elements in the direction of travel of the chain.

13. The combination according to claim 11 wherein; the thickness of said cutter link elements is approximately one half the thickness of the remaining center mounted links of the saw chain.

14. The combination according to claim 12 wherein; the thickness of said cutter link elements is approximately one half the thickness of the remaining center mounted links of the saw chain.

15. The cutter tooth according to claim 14 wherein; said cutter tooth is U-shaped in cross-section.

16. For use in a saw chain, a center-link-mounted cutter tooth comprising; a body portion with sprocket engaging root portions extending therefrom, and spaced mirror image side cutter elements extending from the body portion in a direction opposite the root portion and laterally thereof, said cutter elements being made from flexible metal so as to allow flexing and deformation under normal cutting loads in the area between the cutter elements and the associated body portion and being so disposed as to cause flexing laterally outwardly during cutting to increase the distance therebetween beyond the mechanical width of the tooth.

17. The cutter tooth according to claim 16 including; depth guage elements integral with the body portion of each said cutter elements spaced ahead of the cutter elements in the direction of travel of the chain.

* * * * *